United States Patent
Varghese et al.

(10) Patent No.: US 11,589,229 B2
(45) Date of Patent: Feb. 21, 2023

(54) DYNAMIC WIRELESS ACCESS POINT CONFIGURATION

(71) Applicant: Carrier Corporation, Palm Beach Gardens, FL (US)

(72) Inventors: Joshua Varghese, Ottawa (CA); Phani Pavan Kumar Mangaiahgari, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 234 days.

(21) Appl. No.: 16/747,014

(22) Filed: Jan. 20, 2020

(65) Prior Publication Data

US 2020/0236553 A1 Jul. 23, 2020

(30) Foreign Application Priority Data

Jan. 21, 2019 (IN) ............................. 201911002395

(51) Int. Cl.
| | |
|---|---|
| *G06F 21/00* | (2013.01) |
| *H04L 29/06* | (2006.01) |
| *H04W 12/08* | (2021.01) |
| *H04L 9/40* | (2022.01) |
| *H04W 12/041* | (2021.01) |
| *H04W 12/69* | (2021.01) |
| *B65D 88/12* | (2006.01) |

(52) U.S. Cl.
CPC ......... *H04W 12/08* (2013.01); *H04L 63/0807* (2013.01); *H04W 12/041* (2021.01); *H04W 12/69* (2021.01); *B65D 88/121* (2013.01)

(58) Field of Classification Search
CPC ... H04W 12/08; H04W 12/69; H04W 12/041; H04L 63/0807; B65D 88/121
See application file for complete search history.

(56) References Cited

U.S. PATENT DOCUMENTS

| | | | |
|---|---|---|---|
| 7,512,398 | B2 | 3/2009 | Chambers et al. |
| 7,624,280 | B2 | 11/2009 | Oskari |
| 8,335,488 | B2 | 12/2012 | Despain et al. |
| 9,049,013 | B2 | 6/2015 | Paczkowski et al. |
| 9,432,361 | B2 | 8/2016 | Mahaffey et al. |
| 9,659,422 | B2 | 5/2017 | Lovelock et al. |
| 9,659,424 | B2 | 5/2017 | Huber et al. |
| 9,805,370 | B1 * | 10/2017 | Quigley ................. G06Q 20/20 |
| 2006/0256961 | A1 * | 11/2006 | Brainard ............... H04L 9/0844 380/44 |
| 2007/0001855 | A1 | 1/2007 | Bohman et al. |

(Continued)

FOREIGN PATENT DOCUMENTS

CN 105696870 A 6/2016

OTHER PUBLICATIONS

European Search Report; European Application No. 20152695.1; filed: Jan. 20, 2020; dated May 29, 2020; 10 pages.

(Continued)

*Primary Examiner* — Izunna Okeke
(74) *Attorney, Agent, or Firm* — Cantor Colburn LLP

(57) ABSTRACT

Methods and systems for dynamic wireless network configuration are provided. Aspects include receiving, by an application on a user device, a token, deriving, by the application, a unique identifier and passcode based at least in part on the token, and controlling remote access to a first computer system based on the unique identifier and passcode.

12 Claims, 4 Drawing Sheets

(56) References Cited

U.S. PATENT DOCUMENTS

| | | |
|---|---|---|
| 2011/0128121 A1 | 6/2011 | Shachar et al. |
| 2012/0229251 A1 | 9/2012 | Ufkes |
| 2013/0257589 A1 | 10/2013 | Mohiuddin et al. |
| 2013/0257590 A1 | 10/2013 | Kuenzi et al. |
| 2013/0335193 A1 | 12/2013 | Hanson et al. |
| 2015/0228133 A1 | 8/2015 | Capaldi-Tallon |
| 2015/0327307 A1* | 11/2015 | Randrianasolo ...... H04W 12/35 370/329 |
| 2016/0191245 A1 | 6/2016 | Qin |
| 2016/0269901 A1* | 9/2016 | Cao ....................... H04L 9/3226 |

OTHER PUBLICATIONS

Yanjie et al., "Secure and Smart Development for Intermodal Transport," APEC Transportation Working Group, Jun. 2011, 62 pages.

* cited by examiner

DYNAMIC WIRELESS ACCESS POINT CONFIGURATION

CROSS-REFERENCE TO RELATED APPLICATIONS

This application claims the benefit of Indian Patent Application number 201911002395 filed Jan. 21, 2019, which is incorporated herein by reference in its entirety.

BACKGROUND OF THE INVENTION

The subject matter disclosed herein relates to refrigeration systems. More specifically, the subject matter disclosed herein relates to refrigeration of containers utilized to store and ship cargo.

Goods are often transported across great distances, sometimes using a variety of different modes of transportation. One common method of transporting goods in such a manner is the use of intermodal shipping containers. Such containers are of a standardized size, such that multiple containers are easily handled and stacked. A common size is 8 feet (2.44 m) wide by 8 feet, 6 inches (2.59 m) high, with a length of either 20 feet (6.1 m) or 40 feet (12.2 meters). Other lengths can be used, such as 45 feet (13.7 m), 48 feet (14.6 m), and 53 feet (16.2 m). The benefit of standardized intermodal containers is that goods can be shipped from a variety of different locations without ever having to be removed from the container. The container itself is moved to and from a trailer, rail carrier, or ship.

Some containers include computerized portions. For example, a refrigerated container can have a computer that is used to monitor or control the refrigeration unit. The computer could, for example, change the temperature of the refrigerated container. In addition, the container can monitor the refrigerated container. One can determine the maximum temperature reached in the container, the status of the refrigerant or any electronics of the computer.

An issue that can occur is that it can be difficult to access the computer of each container. Intermodal shipping containers are typically constructed such that they are stackable and can be packed in tight quarters. Therefore, there can be 6 to 12 containers in a single stack of containers. To maximize the number of containers on a ship or at a shipping facility, the containers can be placed very close to each other. Accessing a single container in such a configuration can be difficult.

BRIEF DESCRIPTION OF THE INVENTION

According to one embodiment, a method is provided. The method includes receiving, by an application on a user device, a token, deriving, by the application, a unique identifier and passcode based at least in part on the token, and controlling remote access to a first computer system based on the unique identifier and passcode.

In addition to one or more of the features described above, or as an alternative, further embodiments of the method may include that the first computer system controls operations of an intermodal shipping container.

In addition to one or more of the features described above, or as an alternative, further embodiments of the method may include that the token is derived from an indicia on an intermodal shipping container.

In addition to one or more of the features described above, or as an alternative, further embodiments of the method may include that the indicia includes a light emitting diode (LED) display on the intermodal shipping container.

In addition to one or more of the features described above, or as an alternative, further embodiments of the method may include that the unique identifier includes a secure set identifier (SSID).

In addition to one or more of the features described above, or as an alternative, further embodiments of the method may include that the unique identifier includes a time length for validity.

In addition to one or more of the features described above, or as an alternative, further embodiments of the method may include that the unique identifier and passcode are derived using a key derivation function.

In addition to one or more of the features described above, or as an alternative, further embodiments of the method may include that receiving the token includes transmitting, by a first transceiver, an activation signal and receiving, from a second transceiver, the token responsive to transmitting the activation signal.

In addition to one or more of the features described above, or as an alternative, further embodiments of the method may include that the first transceiver is associated with the user device and the second transceiver is associated with an intermodal shipping container.

In addition to one or more of the features described above, or as an alternative, further embodiments of the method may include that the user device includes at least one of a mobile phone, tablet, or laptop computer.

According to one embodiment, a system is provided. The system includes a processor communicatively coupled to a memory, the processor configured to receive a token, derive a unique identifier and passcode based at least in part on the token, and control remote access to a first computer system based on the unique identifier and passcode.

In addition to one or more of the features described above, or as an alternative, further embodiments of the system may include that the first computer system controls operations of an intermodal shipping container.

In addition to one or more of the features described above, or as an alternative, further embodiments of the system may include that the token is derived from an indicia on an intermodal shipping container.

In addition to one or more of the features described above, or as an alternative, further embodiments of the system may include that the indicia includes a light emitting diode (LED) display on the intermodal shipping container.

In addition to one or more of the features described above, or as an alternative, further embodiments of the system may include that the unique identifier includes a secure set identifier (SSID).

In addition to one or more of the features described above, or as an alternative, further embodiments of the system may include that the unique identifier include a time length for validity.

In addition to one or more of the features described above, or as an alternative, further embodiments of the system may include that the unique identifier and passcode are derived using a key derivation function.

In addition to one or more of the features described above, or as an alternative, further embodiments of the system may include that receiving the token includes transmitting, by a first transceiver, an activation signal and receiving, from a second transceiver, the token responsive to transmitting the activation signal.

In addition to one or more of the features described above, or as an alternative, further embodiments of the system may include that the first transceiver is associated with the user device and the second transceiver is associated with an intermodal shipping container.

In addition to one or more of the features described above, or as an alternative, further embodiments of the system may include that the user device includes at least one of a mobile phone, tablet, or laptop computer.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
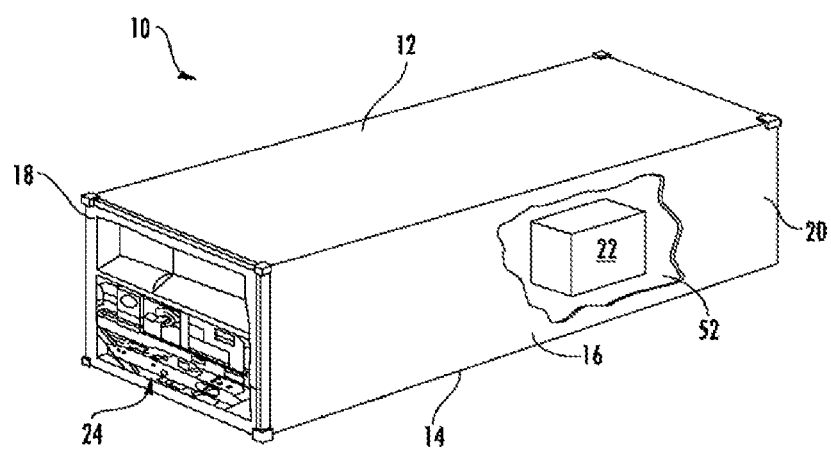
FIG. 1 is a schematic illustration of an embodiment of a refrigerated transportation cargo container.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Shown in FIG. 1 is an embodiment of a refrigerated cargo container 10. The cargo container 10 is formed into a generally rectangular construction, with a top wall 12, a directly opposed bottom wall 14, opposed side walls 16 and a front wall 18. The cargo container 10 further includes a door or doors (not shown) at a rear wall 20, opposite the front wall 18. The cargo container 10 is configured to maintain a cargo 22 located in the interior 52 of the cargo container 10 at a selected temperature through the use of a refrigeration unit 24 located at the container 10. The cargo container 10 is mobile and is utilized to transport the cargo 22 via, for example, a truck, a train or a ship. The refrigeration unit 24 is located at the front wall 18, and includes a compressor, a condenser, an expansion valve, an evaporator, and an evaporator fan, as well as other ancillary components. The cargo container 10 described herein is merely exemplary and not intended to limit the application, uses, and/or technical scope of the present disclosure, which can be embodied in various forms known in the art.

Figure 2:
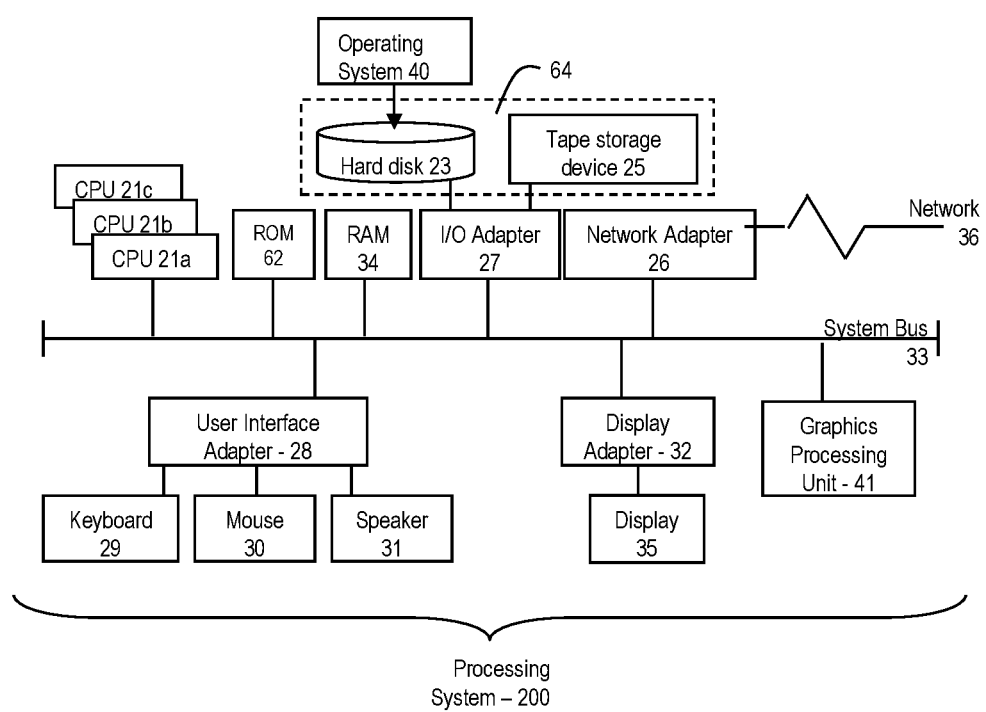
FIG. 2 depicts a block diagram of a computer system for use in implementing one or more embodiments of the disclosure.

Referring to FIG. 2, there is shown an embodiment of a processing system 200 for implementing the teachings herein. In this embodiment, the system 200 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 (RAM) and various other components via a system bus 33. Read only memory (ROM) 62 is coupled to the system bus 33 and may include a basic input/output system (BIOS), which controls certain basic functions of system 200.

FIG. 2 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 64. Operating system 40 for execution on the processing system 200 may be stored in mass storage 64. A network communications adapter 26 interconnects bus 33 with an outside network 36 enabling data processing system 200 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 200 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel. The processing system 200 described herein is merely exemplary and not intended to limit the application, uses, and/or technical scope of the present disclosure, which can be embodied in various forms known in the art.

Thus, as configured in FIG. 2, the system 200 includes processing capability in the form of processors 21, storage capability including system memory 34 and mass storage 64, input means such as keyboard 29 and mouse 30, and output capability including speaker 31 and display 35. In one embodiment, a portion of system memory 34 and mass storage 24 collectively store an operating system coordinate the functions of the various components shown in FIG. 2. FIG. 2 is merely a non-limiting example presented for illustrative and explanatory purposes.

In one or more embodiments, the processing system 200 can be utilized in a thermostat, controller, or other component in the refrigeration unit 24 in FIG. 1, for example.

Turning now to an overview of technologies that are more specifically relevant to aspects of the disclosure, as described above, intermodal shipping containers are very useful for shipping goods through long distances, without the need to load and unload a single container multiple times through the journey. Certain intermodal containers are computerized, such as refrigerated intermodal containers. It can be desirable to access the computer of an intermodal shipping container to control or monitor the container. However, it can be difficult to do so.

It could be possible to establish a wireless connection to the computer system in the container. However, a difficulty arises because a specific container can have characteristics that change for each shipment. For example, a first shipment of a specific container may be carried out by shipping company A. But the next week, the same container in the same ship yard is being used by shipping company B. Therefore, with each shipment, a worker might have to access a completely different set of containers to check their status or change settings. Thus, management of security can be difficult. Containers operate in a highly disconnected environment where management of access credentials (either locally or on servers) is not possible. Cloud connections can be difficult because there can be instances where access to the Internet is difficult (such as on a cargo ship). Thus, access of authentication remains a problem.

Another difficulty is security. Containers are secured by physical security, such as fences and allowing only authorized personnel to have access to secured areas. The use of wireless computing capability could permit bad actors to access otherwise secured computers via a wireless computer connection by wirelessly connecting to a container's computer system while the bad actor is located outside the secured area.

Turning now to an overview of the aspects of the disclosure, one or more embodiments address the above-described shortcomings of the above described technologies by providing systems and methods for dynamic wireless network configuration in containers which also provides additional security for the wireless network. In one or more embodiments, a rolling service set identifier (SSID) for a container. Logical networks are identified by SSIDs (service set identifiers), which serve as "network names" and are typically natural language labels. A constantly changing SSID benefits by making it difficult for an unauthorized attacker to physically locate a container that is being accessed and would also make it difficult for a bad actor to continuously direct an attack to a known SSID. In one or more embodiments, an SSID can be generated utilizing a password based key derivation function algorithm, for example. A token for decoding the SSID can be obtained by physically interacting with a container by a user. Once a user obtains a token from the container, the user can enter the token into an application (app) on a user device such as a mobile phone or tablet. The app can decode and list all the container SSIDs based on the entered token. By utilizing a token requiring a physical interaction with the container, only authorized users that are physically present at the container location can access the container.

Figure 3:
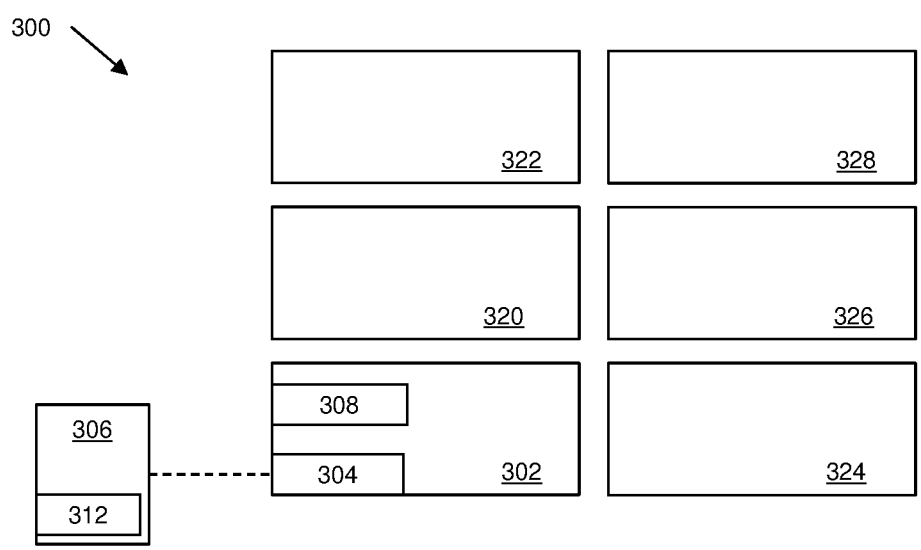
FIG. 3 depicts a block diagram of a system for dynamic wireless network configuration for an intermodal shipping container according to one or more embodiments of the disclosure.

Turning now to a more detailed description of aspects of the present disclosure, FIG. 3 depicts a block diagram of a system for dynamic wireless network configuration for an intermodal shipping container according to one or more embodiments. The system 300 depicts a group of intermodal shipping containers (302, 320, 322, 324, 326, and 328). As discussed above, intermodal shipping containers are often stacked and arranged to conserve space in a shipping yard or dock. For a user to access information about a container, the user would need to access the container controller over a wireless network using a user device such as a mobile phone, tablet, and/or laptop computer. The system 300 includes a target container 302 for which a user device 306 is attempting to connect. The target container 302 includes a container controller 304 and a token 308. In one or more embodiments, the token 308 can be printed on a portion of the target container 302 or can be obtained through an interaction with the target container 302. For example, a token 308 can be obtained by entering a code into a device associated with the container 302 such as, for example, a control panel or a light emitting diode (LED) display. Once obtained, the token 308 can be entered into an application 312 on the user device 306. The application 312 utilizes the token 308 to derive a unique identifier for the container 302 along with a passcode. The unique identifier can be a secure set identifier (SSID) which corresponds to a network name. Utilizing the passcode, the user device 306 can connect to the controller 304 for the container 302 over a wireless network. In one or more embodiments, the application 312 can utilize a key derivation function which receives the token 308 as an input to then derive the SSID and passcode for the container 302. In one or more embodiments, the unique identifier and passcode can be valid for a set period of time. After the expiration of the period of time, the unique identifier and passcode would be invalid and not allow access to the controller 304 on the container 302.

In one or more embodiments, the unique identifier for the target container 302 can change dynamically. For example, the unique identifier can change every four hours or other period of time. This allows for additional cyber security by changing the accessing credentials periodically.

In one or more embodiments, the token 308 can be obtained by the user device 306 by transmitting an activation signal, by a transceiver on the user device 306, to a second transceiver on the container 302. The second transceiver can be operated in a low power mode prior to receiving the activation signal. The activation signal thus "wakes up" the second transceiver which then transmits the token 308 to the user device 306. In one or more embodiments, the second transceiver can be a BLUETOOTH™ low-energy beacon that can transmit a token to the user device 306 to be utilized to access the container controller 304 for the container 302.

In one or more embodiments, the container controllers 304, transceivers, and user device 306 can be implemented on the processing system 200 found in FIG. 2.

Figure 4:
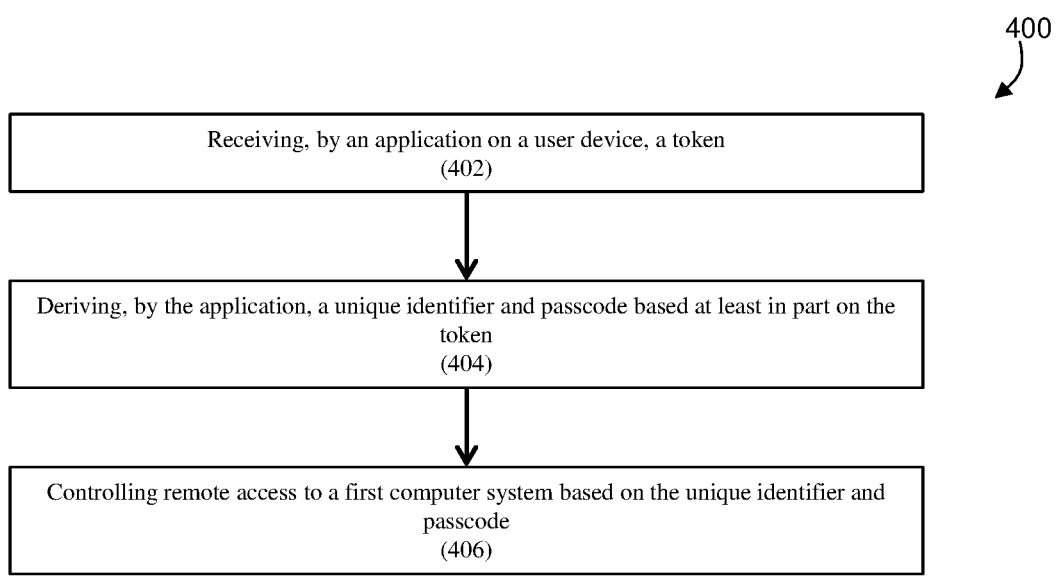
FIG. 4 depicts a flow diagram of a method for dynamic wireless network configuration according to one or more embodiments of the disclosure.

FIG. 4 depicts a flow diagram of a method for dynamic wireless network configuration according to one or more embodiments. The method 400 includes receiving, by an application on a user device, a token, as shown in block 402. The method 400, at block 404, includes deriving, by the application, a unique identifier and passcode based at least in part on the token. And at block 406, the method 400 includes controlling remote access to a first computer system based on the unique identifier and passcode.

Additional processes may also be included. It should be understood that the processes depicted in FIG. 4 represent illustrations and that other processes may be added or existing processes may be removed, modified, or rearranged without departing from the scope and spirit of the present disclosure.

A detailed description of one or more embodiments of the disclosed system and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for dynamic wireless network configuration, the method comprising:
   receiving, by an application on a user device, a token;
   deriving, by the application, a unique identifier and passcode based at least in part on the token; and
   controlling, by the application, remote access to a first computer system based on the unique identifier and passcode;
   wherein receiving the token comprises:
   transmitting, by a first transceiver, an activation signal; and
   receiving, from a second transceiver, the token responsive to the transmitting the activation signal;
   wherein the first transceiver is associated with the user device; and
   wherein the second transceiver is associated with an intermodal shipping container;
   wherein the token is derived from an indicia on the intermodal shipping container;
   wherein the indicia includes a light emitting diode (LED) display on the intermodal shipping container.

2. The method of claim 1, wherein the first computer system controls operations of the intermodal shipping container.

3. The method of claim 1, wherein the unique identifier includes a secure set identifier (SSID).

4. The method of claim 1, wherein the unique identifier includes a time length for validity.

5. The method of claim 1, wherein the unique identifier and passcode are derived using a key derivation function.

6. The method of claim 1, wherein the user device includes at least one of a mobile phone, tablet, or laptop computer.

7. A system for dynamic wireless network configuration comprising:
   a processor communicatively coupled to a memory, the processor configured to:
   receive a token;
   derive a unique identifier and passcode based at least in part on the token; and
   control remote access to a first computer system based on the unique identifier and passcode;
   wherein receiving the token comprises:
   transmitting, by a first transceiver, an activation signal; and
   receiving, from a second transceiver, the token responsive to the transmitting the activation signal;
   wherein the first transceiver is associated with the user device; and
   wherein the second transceiver is associated with an intermodal shipping container;
   wherein the token is derived from an indicia on the intermodal shipping container;
   wherein the indicia includes a light emitting diode (LED) display on the intermodal shipping container.

8. The system of claim 7, wherein the first computer system controls operations of the intermodal shipping container.

9. The system of claim 7, wherein the unique identifier includes a secure set identifier (SSID).

10. The system of claim 7, wherein the unique identifier include a time length for validity.

11. The system of claim 7, wherein the unique identifier and passcode are derived using a key derivation function.

12. The system of claim 7, wherein the user device includes at least one of a mobile phone, tablet, or laptop computer.

* * * * *